US010221015B2

(12) United States Patent
Battles et al.

(10) Patent No.: US 10,221,015 B2
(45) Date of Patent: Mar. 5, 2019

(54) AUTOMATED ITEM SINGULATION

(71) Applicant: Amazon Technologies, Inc., Seattle, WA (US)

(72) Inventors: Jon Stuart Battles, North Bend, WA (US); Martin Peter Aalund, Seattle, WA (US); Toby Ge Xu, Seattle, WA (US); Samuel Gardner Garrett, Seattle, WA (US); Yan Yan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 15/193,495

(22) Filed: Jun. 27, 2016

(65) Prior Publication Data
US 2017/0369244 A1 Dec. 28, 2017

(51) Int. Cl.
B65G 1/137 (2006.01)
B65G 47/14 (2006.01)
B65G 47/26 (2006.01)
B25J 9/16 (2006.01)
(Continued)

(52) U.S. Cl.
CPC ............ B65G 1/137 (2013.01); B25J 9/1697 (2013.01); B65G 27/04 (2013.01); B65G 47/1485 (2013.01); B65G 47/26 (2013.01); B65G 47/902 (2013.01); B65G 2203/041 (2013.01)

(58) Field of Classification Search
USPC ........................................................ 700/219
See application file for complete search history.

(56) References Cited

U.S. PATENT DOCUMENTS 5,314,055 A * 5/1994 Gordon ................. B25J 9/1697
198/395
2006/0057239 A1* 3/2006 Hariki ................ B65G 47/1457
425/126.1
(Continued)

FOREIGN PATENT DOCUMENTS

EP 1642853 A2 4/2006
JP H0264513 U 5/1990
(Continued)

OTHER PUBLICATIONS

FANUC America Corporation: "Flexible Part Feeding with Graco's G-Flex (TM) 1500 Feeder and FANUC Robots," You Tube, Feb. 14, 2014, pp. 1-3, XP054977786, Retrieved from the Internet: URL:https://www.youtube.com/watch?v=TGOvEFWde9M (retrieved Oct. 6, 2017] Entire Video.
(Continued)

Primary Examiner — Kyle O Logan
(74) Attorney, Agent, or Firm — Arthorus, PLLC

(57) ABSTRACT

Described are systems, methods, and apparatus for automated item singulation. The system includes a singulation station in which a plurality of different type items may be transitioned onto a singulation table. The singulation table activates and the movement of the singulation table causes the items to de-shingle, separate in distance with respect to one another and migrate along the singulation table toward a pick conveyor. As the de-shingled and singulated items arrive on the pick conveyor they are detected and individually picked by a robotic unit and transitioned from the singulation station.

19 Claims, 9 Drawing Sheets

(51) Int. Cl.
*B65G 27/04* (2006.01)
*B65G 47/90* (2006.01)

(56) References Cited

U.S. PATENT DOCUMENTS

| | | | |
|---|---|---|---|
| 2006/0278498 A1* | 12/2006 | Uusitalo | B65G 47/5145 198/525 |
| 2007/0274812 A1* | 11/2007 | Ban | B25J 9/1697 414/217 |
| 2013/0054025 A1* | 2/2013 | Ito | B25J 9/1697 700/246 |
| 2014/0277721 A1* | 9/2014 | Tomo | B25J 15/06 700/253 |
| 2014/0341695 A1 | 11/2014 | Girtman et al. | |
| 2016/0075031 A1* | 3/2016 | Gotou | B25J 9/1697 700/259 |

FOREIGN PATENT DOCUMENTS

| | | |
|---|---|---|
| WO | 2003104116 A1 | 12/2003 |
| WO | 2016100235 A1 | 6/2016 |

OTHER PUBLICATIONS

International Search Report and Written Opinion for International Application No. PCT/US2017/039297 dated Oct. 19, 2017, 17 pages.

\* cited by examiner

AUTOMATED ITEM SINGULATION

BACKGROUND

Many companies store, package, and ship items and/or groups of items from materials handling facilities. For example, many e-commerce companies and some traditional retail companies house inventory in a materials handling facility and ship items to various destinations (e.g., customers, stores) from the materials handling facility. Receipt of inventory in the materials handling facility, storage of inventory within the materials handling facility, shipping of items from the materials handling facility and the overall flow or movement of items within the materials handling facility (e.g., from receive to storage and/or from storage to shipping) is often labor intensive. In many instances, a single item may be handled by multiple human agents during a particular flow of the item through the facility. Multiple human interactions increase the costs to handle the item, the time to complete a flow of the item through the materials handling facility, and increase the opportunity for mishandling of the item.

BRIEF DESCRIPTION OF THE DRAWINGS

The detailed description is set forth with reference to the accompanying figures. In the figures, the left-most digit(s) of a reference number identifies the figure in which the reference number appears.

Figure 1:
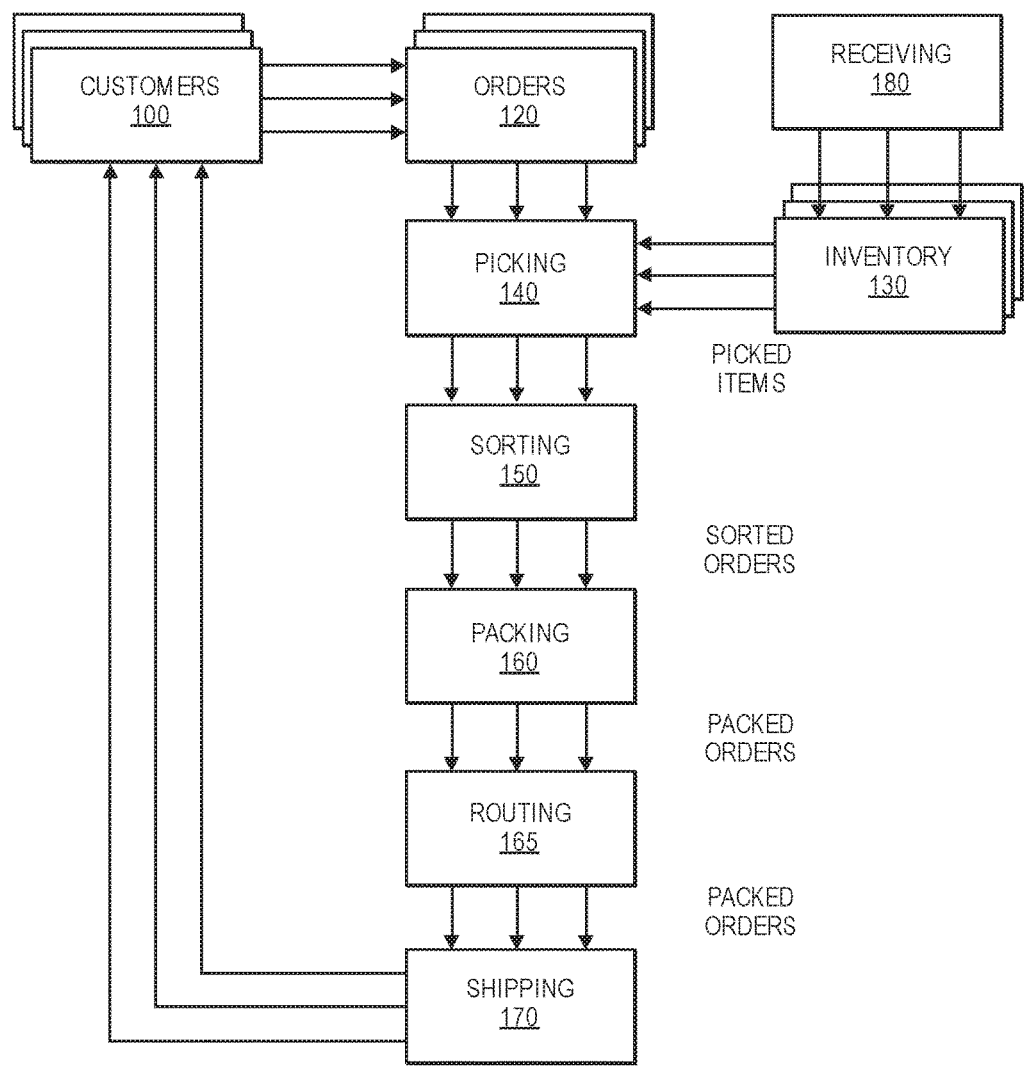
FIG. 1 illustrates a broad view of the operations of a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Described are systems, methods, and apparatus for automated item singulation. The system includes a singulation station in which a plurality of different type items may be transitioned onto a singulation table of the singulation station. For example, a first robotic unit may receive a tote that includes a plurality of various items, some or all of which may be of different types and/or sizes. The robotic unit transitions the items from the tote onto a singulation table. In one implementation, the robotic unit may transition the items by rotating the tote so that the items transition from the tote onto the singulation table under a force of gravity.

As items are transitioned to the singulation table, some of the items may be touching, or partially overlapping, or laying on one another (referred to herein as shingled). As discussed further below, the singulation table is configured to move (e.g., vibrate) according to a singulation pattern. The movement of the singulation table causes the items to de-shingle and separate in distance with respect to one another such that the items are no longer touching and/or shingled. In addition, the surface material, configuration, slope, and/or motion of the singulation table cause the items to migrate along the singulation table toward a pick conveyor. As the items reach the pick conveyor, the items are conveyed by the pick conveyor to a pick area.

When an item is within the pick area, the item is detected and picked by a second robotic unit. As discussed further below, the second robotic unit may include an astrictive end effector that uses at least one of suction, adhesion, electroadhesion, or magnetics to pick the item from the pick area and transition the item from the singulation station.

The implementations of singulation stations, as discussed herein, may be utilized at various stages within a materials handling facility. For example, a singulation station may be utilized at a receiving station to singulate disparate items as they are initially received into the materials handling facility. Such singulation at item receive may be beneficial so that the singulated items may be passed through an identification scanner and accurately identified. For example, if the items include one or more visual tags (e.g., barcodes, bokodes, etc.) and/or active or passive tags (e.g., Radio Frequency Identification (RFID) tags), the singulated items may be autonomously passed through a tag identification system that detects and identifies the items based on the tags.

As another example, the singulation station may be utilized at a sorting station to singulate picked items so they can be routed to different packing stations according to the orders to which those items are associated. For example, an agent may pick multiple different items, of the same or different types, into a same tote. Some or all of those items may be associated with different orders. When the tote of items arrives at the sorting station, the items may be transitioned to the singulation station, singulated, and autonomously transitioned from the singulation station and routed according to the orders with which each item is associated.

A "shipment set," as used herein, is one or more items that are to be processed through the materials handling facility and shipped or otherwise transported from the materials handling facility. A shipment set may include all items of an order, less than all items of an order, one or more items that are to be transferred from the materials handling facility to another location (e.g., to another materials handling facility), etc.

A block diagram of a materials handling facility, which, in one implementation, may be a materials handling facility configured to utilize various systems and methods described herein, is illustrated in FIG. 1. In this example, multiple customers 100 may submit orders 120 to a distributor, such as an e-commerce website, where each order 120 specifies one or more items from inventory 130 to be shipped to the customer or to another entity specified in the order.

A materials handling facility typically includes receiving operations 180 for receiving shipments of stock from various vendors and storing the received stock in inventory 130. To fulfill the orders 120, the one or more items specified in each order may be retrieved or "picked" from inventory 130 (which may also be referred to as stock storage) in the materials handling facility, as indicated by picking operations 140. In some implementations, the items in an order may be divided into multiple shipment sets for fulfillment by a planning service before fulfillment instructions are generated (not shown).

The picking of items from inventory locations may be done using any of a variety of picking techniques. For example, the items may be picked by human picking agents that receive pick lists indicating items to be picked. The items on a pick list may correspond to the same and/or different orders. Alternatively, or in addition thereto, one or more automated techniques, such as mobile drive units, may be used to pick items from inventory locations. As will be appreciated, an agent or robotic units may pick a variety of items, some or all of the items associated with different orders and/or being of different types. As the agent picks the items, the items may all be placed into the same tote until the tote becomes full or the agent has completed picking items.

As totes are filled with picked items, the totes are routed to a sorting station 150 for sorting into their respective orders or shipment sets. Items may arrive at the sorting station in any order and the sorting station 150 will sort the items into corresponding shipment sets. Picked items may be delivered to one or more stations in the materials handling facility for sorting operations 150 into their respective shipment sets and then transferred to one or more packing stations 160 at which the items of a shipment set are packed into containers. The routing operations 165 may sort packed orders to shipping operations 170 for shipping of the packed items to a customer. Alternatively, or in addition thereto, sorted items may be routed to other processing stations within the materials handling facility, routed to other materials handling facilities, etc.

Note that a picked, packed and shipped shipment set does not necessarily include all of the items ordered by the customer; a shipped shipment set may include only a subset of the ordered items available to ship at one time from one fulfillment facility. Also note that the various operations of a materials handling facility may be located in one building or facility, or alternatively may be spread or subdivided across two or more buildings or facilities.

Note that the arrangement and order of operations illustrated by FIG. 1 is merely one example of many possible implementations of the operations of a materials handling facility. Other types of materials handling, manufacturing, or order fulfillment facilities may include different, fewer, or additional operations and resources, according to different implementations. A materials handling facility may be any type of facility in which items are handled, including, but not limited to, order fulfillment centers, rental centers, retailer centers, distribution centers, packaging facilities, shipping facilities, libraries, museums, warehouse storage facilities, and the like.

Figure 2:
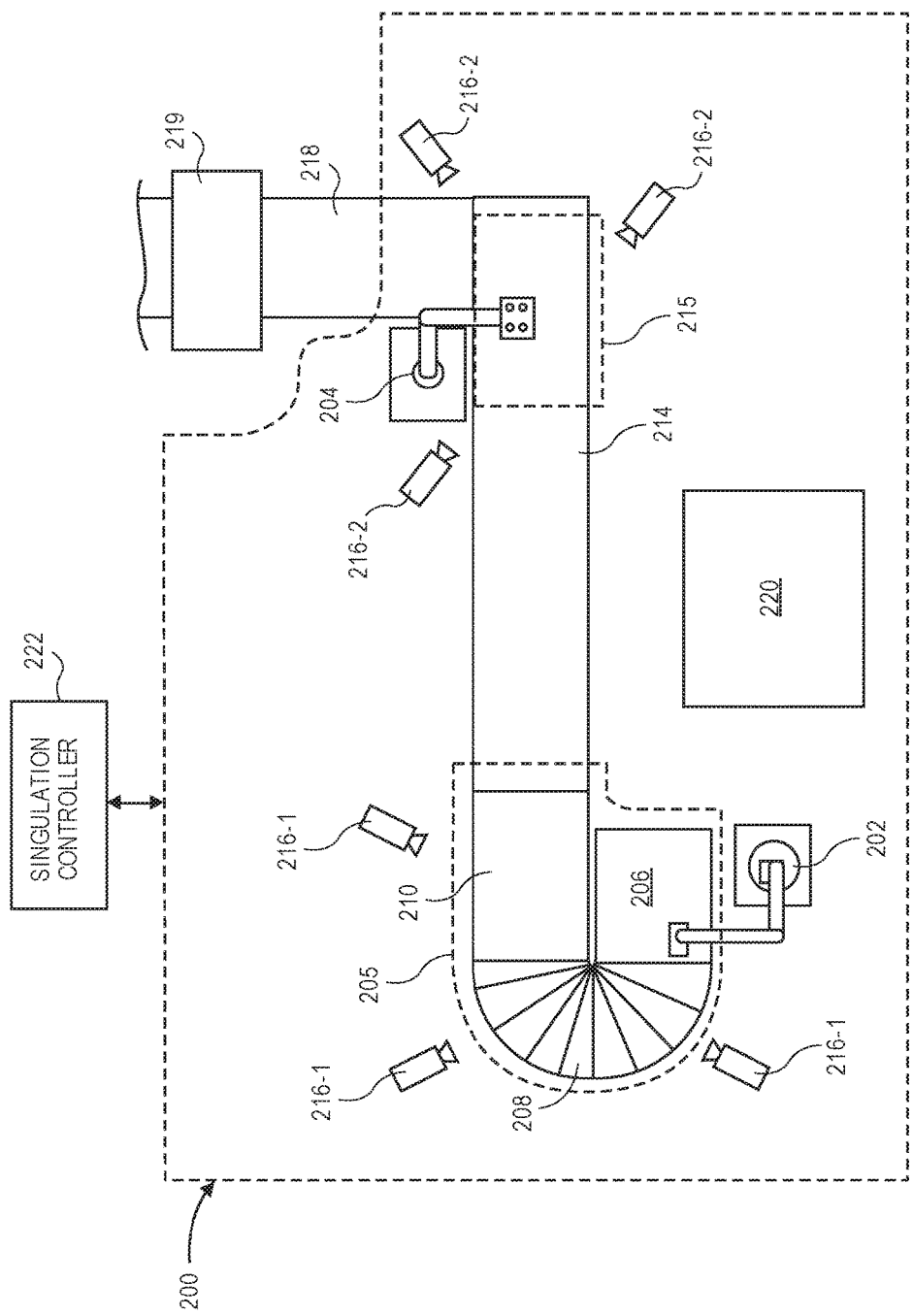
FIG. 2 illustrates a singulation station, according to an implementation.

FIG. 2 illustrates a singulation station 200, according to an implementation. The singulation station includes a tote receiving area 220, a first robotic unit 202, a singulation table 205, a pick conveyor 214, a pick area 215, and a second robotic unit 204. One or more imaging elements 216-1, 216-2 may also be included at or near the singulation station 200 and be configured to obtain images of items as the items migrate through the singulation station 200. The imaging elements 216-1, 216-2, along with the first robotic unit 202, second robotic unit 204, singulation table 205, and pick conveyor 214 may communicate with and be controlled by the singulation controller 222.

The singulation controller 222 may operate on one or more computing resources that may be local or remote to the material handling facility. The computing resources may form a portion of a network-accessible computing platform implemented as a computing infrastructure of processors, storage, software, data access, and other components that is maintained and accessible via a network. The components of the singulation station 200 may communicatively couple to the computing resources via a network which may represent wired technologies (e.g., wires, USB, fiber optic cable, etc.), wireless technologies (e.g., RF, cellular, satellite, Bluetooth, etc.), and/or other connection technologies.

The computing resources may include one or more servers, which may be arranged in any number of ways, such as server farms, stacks, and the like that are commonly used in data centers. Furthermore, the servers may include one or more processors and memory which may store the singulation controller 222.

The tote receiving area 220 may be any space or configuration that is adjacent the first robotic unit for receiving totes that may be engaged and manipulated by the first robotic unit 202. In some implementations, a pallet or cart containing multiple totes, each tote containing multiple items may be positioned at the tote receiving area 220. In some implementations, the totes may include items that were picked from an inventory area of the materials handling facility by one or more agents and the items may correspond to various shipment sets. Likewise, the totes may be of various sizes and shapes, each of which may include an engagement area that allows engagement by the first robotic unit.

The first robotic unit 202 may be any type of autonomous unit that is capable of engaging a tote at the tote receiving area 220, moving the tote over the singulation table 205, and rotating the tote such that the items transition from the tote onto the singulation table 205 under the force of gravity. In one implementation, the first robotic unit may be a six-way positionable robotic arm that is configured with hooks, clamps, and/or other forms of lifts that can engage, lift, move and rotate totes.

In other implementations, the first robotic unit 202 may be a single axis mechatronics unit that is configured to rotate about the axis to transition items onto the receiving area 206. In still another example, the first robotic unit 202 may be an aerial vehicle, such as an unmanned aerial vehicle ("UAV"), that is configured to engage a plurality of items and/or a tote containing a plurality of items, aerially transport the engaged items to the singulation station 200, and transition the engaged plurality of items onto the receiving area 206. Still further, the singulation station may be configured without the first robotic unit 202 and items may be manually transitioned to the receiving area 206 of the singulation station. For example, a human agent may receive totes containing multiple items and transition those items from the tote onto the receiving area 206.

As discussed further below with respect to FIGS. 3-4, the singulation table 205 may include one or more segments, each of which may be activated together or separately. In the illustrated implementation, the singulation table 205 includes a receiving area 206 onto which the first robotic unit initially transitions items from a tote. The receiving area 206 of the singulation table 205 may be oriented substantially horizontal. In other implementations, the receiving area 206 may be tilted such that it either has a positive forward pitch, a negative forward pitch, a side pitch in either direction, or a combination of a forward pitch (positive or negative) and a side pitch. Likewise, the overall shape of the surface may be substantially planar, crowned, domed, concave, convex, irregular, or any other shape or combination of shapes. In addition, the material that forms a top surface of the receiving area onto which the items are positioned may be formed of any one or more of a variety of materials. For example, the top surface of the receiving area 206 of the singulation table 205 may be metal, plastic, rubber, fabric, carpet, wood, tile, nylon, etc. In some implementations, different portions of the receiving area may be formed of different materials and/or have different shapes, thereby providing different coefficients of friction between items placed on that portion of the receiving area and the item. For example, a first material may be included in a first section of the sorting table that provides a first coefficient of friction that is beneficial for separating light items, and a second material may be included in a second section of the sorting table that provides a second coefficient of friction that is beneficial for separating heavier items.

In addition to the receiving area 206 of the singulation table having potentially a variety of configurations (shape, material, angle), the receiving area may be active. Specifically, the receiving area 206 of the singulation table 205 may be coupled to an actuator, such as a motor, servo, oscillator, etc. that causes the surface of the receiving area 206 onto which items are placed to vibrate, oscillate, shake, or otherwise move. In some implementations, the receiving area 206 may be coupled to multiple actuators such that the actuators cause different forms of movement at different times and/or along different portions of the receiving area. As discussed further below, the movement of the receiving area 206, alone or in conjunction with the configuration of the receiving area, causes items placed on the receiving area to physically migrate or move along the receiving area, de-shingling and separating in distance from one another.

As the receiving area 206 of the singulation table 205 moves, the items migrate along the receiving area 206 toward and onto a junction section 208 of the singulation table 205. The junction section 208 of the singulation table 205 may, like the receiving area, have a variety of shapes, sizes, surface materials, and/or other properties. In the illustrated example, the junction section 208 includes an approximate one-hundred and eighty degree turn and may cascade as a series of steps downward from the receiving area 206 such that the items transition down each step as they migrate through the junction section 208.

Similar to the receiving area 206, the junction section 208 of the singulation table 205 may be oriented substantially horizontal. In other implementations, the junction section 208 may include a series of steps, be tilted such that it either has a positive forward pitch, a negative forward pitch, a side pitch in either direction, or a combination of a forward pitch (positive or negative) and a side pitch. Likewise, the overall shape of the surface of the junction section 208 may be substantially planar, crowned, domed, concave, convex, irregular, or any other shape. In addition, the material that forms a top surface of the junction section 208 onto which the items are positioned may be formed of any one or more of a variety of materials. For example, the top surface of the junction section 208 of the singulation table 205 may be metal, plastic, rubber, fabric, carpet, wood, tile, nylon, etc. In some implementations, different portions of the junction section 208 may be formed of different materials and/or have different shapes, thereby providing different coefficients of friction with the different items.

In addition to the junction section 208 of the singulation table having potentially a variety of configurations (shape, material, angle), like the receiving area, the junction section may be active. Specifically, the junction section 208 of the singulation table 205 may be coupled to an actuator, such as a motor, servo, oscillator, etc. that causes the surface of the junction section 208 to vibrate, oscillate, shake, or otherwise move. In some implementations, the actuator that causes the surface area of the receiving area 206 to move may also be used to cause the surface of the junction section 208 to move. In other implementations, the junction section 208 may be moved through use of one or more actuators that are separate from the actuator of the receiving area. For example, the junction section 208 may be coupled to multiple actuators such that the actuators cause different forms of movement at different times and/or along different portions of the junction section.

In implementations in which different actuators are used to move different sections of the singulation table, the different sections of the singulation table may be moved according to different singulation patterns. This may be beneficial when the plurality of items of different types have different properties. For example, lighter items may migrate and move better along the surface in response to movement from a first singulation pattern and heavier items may migrate and move better along the surface in response to a second singulation pattern. In such an instance, the different sections may use different singulation patterns to further separate and singulate the plurality of items.

In the illustrated example, at the opposing end of the junction section 208 is a transition section 210 of the singulation table. Similar to the receiving area 206 and junction section 208, the transition section may be oriented substantially horizontal or it may be pitched/sloped. In this illustrated example, the transition section 210 has a forward pitch so that items will migrate down the transition section and onto the pick conveyor 214. In other implementations, the transition section 210 may include a series of steps, be tilted such that it has a negative forward pitch, a side pitch in either direction, or a combination of a forward pitch (positive or negative) and a side pitch. Likewise, the overall shape of the surface of the transition section 210 may be substantially planar, crowned, domed, concave, convex, irregular, or any other shape. In addition, the material that forms a top surface of the transition section 210 onto which the items are positioned may be formed of any one or more of a variety of materials. For example, the top surface of the transition section 210 of the singulation table 205 may be metal, plastic, rubber, fabric, carpet, wood, tile, nylon, etc. In some implementations, different portions of the transition section 210 may be formed of different materials and/or have different shapes, thereby providing different coefficients of friction with the different items.

In addition to the transition section 210 of the singulation table 205 having potentially a variety of configurations (shape, material, angle), like the receiving area, and junction section, the transition section may be active. Specifically, the transition section 210 of the singulation table 205 may be coupled to an actuator, such as a motor, servo, oscillator, etc. that causes the surface of the transition section 210 to vibrate, oscillate, shake, or otherwise move. In some implementations, the actuator that causes the surface area of the receiving area 206 and/or the surface of the junction section 208 to move may also be used to cause the surface of the transition section 210 to move. In other implementations, the transition section 210 may be moved through use of one or more actuators that are separate from the actuator(s) of the receiving area and/or the junction section. For example, the transition section 210 may be coupled to multiple actuators such that the actuators cause different forms of movement at different times and/or along different portions of the transition section.

In implementations in which different actuators are used to move different sections of the singulation table, the different sections of the singulation table may be moved according to different singulation patterns. This may be beneficial when the plurality of items of different types have different properties. For example, lighter items may migrate and move better along the surface in response to movement from a first singulation pattern and heavier items may migrate and move better along the surface in response to a second singulation pattern. In such an instance, the different sections may use different singulation patterns to further separate and singulate the plurality of items.

As will be appreciated, the singulation table 205 may have any number of sections and the three-section singulation table 205 illustrated in FIG. 2 and discussed elsewhere herein is provided for discussion purposes only and should not be considered limiting. In other implementations, the singulation table 205 may include additional or fewer sections and the sections may have any type of configuration to facilitate singulation of items as the items migrate from the receiving area 206 of the singulation table 205 toward a pick conveyor 214.

In some implementations, one or more imaging elements 216-1 (e.g., cameras) may be positioned adjacent the singulation table 205 to obtain images of the items as they are singulated by the singulation table and migrate along the singulation table 205. The imaging elements may communicate with the singulation controller 222 and provide the obtained images of items on the singulation table 205 to the singulation controller 222. The singulation controller may process the images to determine which singulation patterns and/or which configurations of the sections of the singulation controller result in better singulation and separation of different types of items. Such information may be maintained by the singulation controller and used in future singulations to select one or more singulation patterns to be utilized by different sections of the singulation table 205 to singulate items based on the items being transitioned on the singulation table 205. In some implementations, the images may also be processed using one or more object detection algorithms to determine items and/or types of items located on the singulation table 205.

The pick conveyor 214 is positioned adjacent the singulation table and configured to receive singulated items as the items transition off of the singulation table 205. In some implementations, the pick conveyor 214 may also provide a function of item singulation. For example, as an item transitions off of the singulation table 205 and onto the pick conveyor 214, the movement of the singulation table may halt for a period of time while the pick conveyor conveys the item away from the singulation table 205. This may further singulate items that are still close together as they reach the end of the singulation table 205. For example, if two items are close together as they reach the end of the singulation table 205, once the first item is transitioned to the pick conveyor the movement of the singulation table may halt so that the second item does not transition from the singulation table to the pick conveyor 214. In addition, the pick conveyor activates to move the item that has transitioned onto the pick conveyor away from the singulation table 205 and thus away from the adjacent item, thereby further singulating the two items. Once the pick conveyor has moved the first item a defined distance, the singulation table may resume movement, thereby causing migration of items from the singulation table onto the pick conveyor in a singulated manner.

The pick conveyor conveys singulated items from the singulation table to a pick area 215. The pick area may be a portion of the pick conveyor that is within reach of the second robotic unit 204 so that the second robotic unit 204, also referred to herein as a picking robotic unit, can pick items from the pick conveyor that are in the pick area 215.

As discussed further below, one or more imaging elements 216-2 (e.g., cameras) may be positioned so that the pick area is within a field of view of the imaging element 216-2. The camera may obtain images of the pick area that are processed by a singulation controller 222 to determine whether an item is present in the pick area. Likewise, the images may be processed to determine a shape and/or pick point on the item indicating a position at which the item is to be picked by the second robotic unit 204. For example, a single camera may be positioned overhead such that the pick area 215 is within a field of view of the camera. As items are conveyed by the pick conveyor into the pick area 215 the camera may obtain an image of the pick area and send the obtained image to the singulation controller 222.

The singulation controller processes the image and determines coordinates within the pick area from which the item is to be picked. For example, the pick area may be segmented into a series of coordinates (e.g., x-coordinates, and y-coordinates) and the overhead camera may be at a fixed position and calibrated such that pixels of the images formed by the camera correspond to the coordinates of the pick area. When an item is conveyed into the pick area, an image is obtained and processed to determine a position of the item within the image. For example, one or more image processing algorithms, such as an edge detection algorithm, object detection algorithm, grey-scale algorithm, or the like may be used to process the image and determine a boundary shape of the object positioned within the pick area 215.

Based on the shape of the object, a pick point is determined. The pick point may be a central coordinate space within the determined shape of the object. In other implementations, a weight distribution or other feature of the object may be considered and included as a factor for selecting a pick point for picking the item from the pick area.

The pick point is provided to the second robotic unit 204 and the second robotic unit utilizes an astrictive end effector to pick the item from the pick area based on the received pick point. The second robotic unit 204, or picking robotic unit, may be any type of autonomous unit that is capable of picking items from the pick area and transitioning the items from the singulation station. In one implementation, the second robotic unit 204 is a six-way positionable robotic arm configured with an astrictive end effector. The astrictive end effector may utilize, for example, suction, adhesion, electroadhesion, or magnetics to pick the item from the pick area. In other implementations, the end effector may not be astrictive. For example, the end effector may be a physical surface that is positioned adjacent an item and used to swipe, push, or otherwise move an item from the pick area away from the singulation station. In still another example, the second robotic unit 204 may be a UAV that is configured with an end effector that can pick or otherwise move items from the pick area.

Upon picking of the item, the item is transitioned by the second robotic unit 204 from the singulation station. For example, if the singulation station is included as part of the sorting station 150 (FIG. 1), it may be adjacent to an item identification station that includes a conveyor 218 and an item identification component 219 that scans and identifies the item. In other implementations, the second robotic unit may transition the picked item from the singulation station into another tote, onto another conveyor, to shipping operations, and/or any other location or station to which the picked item is to be transitioned.

Figure 3:
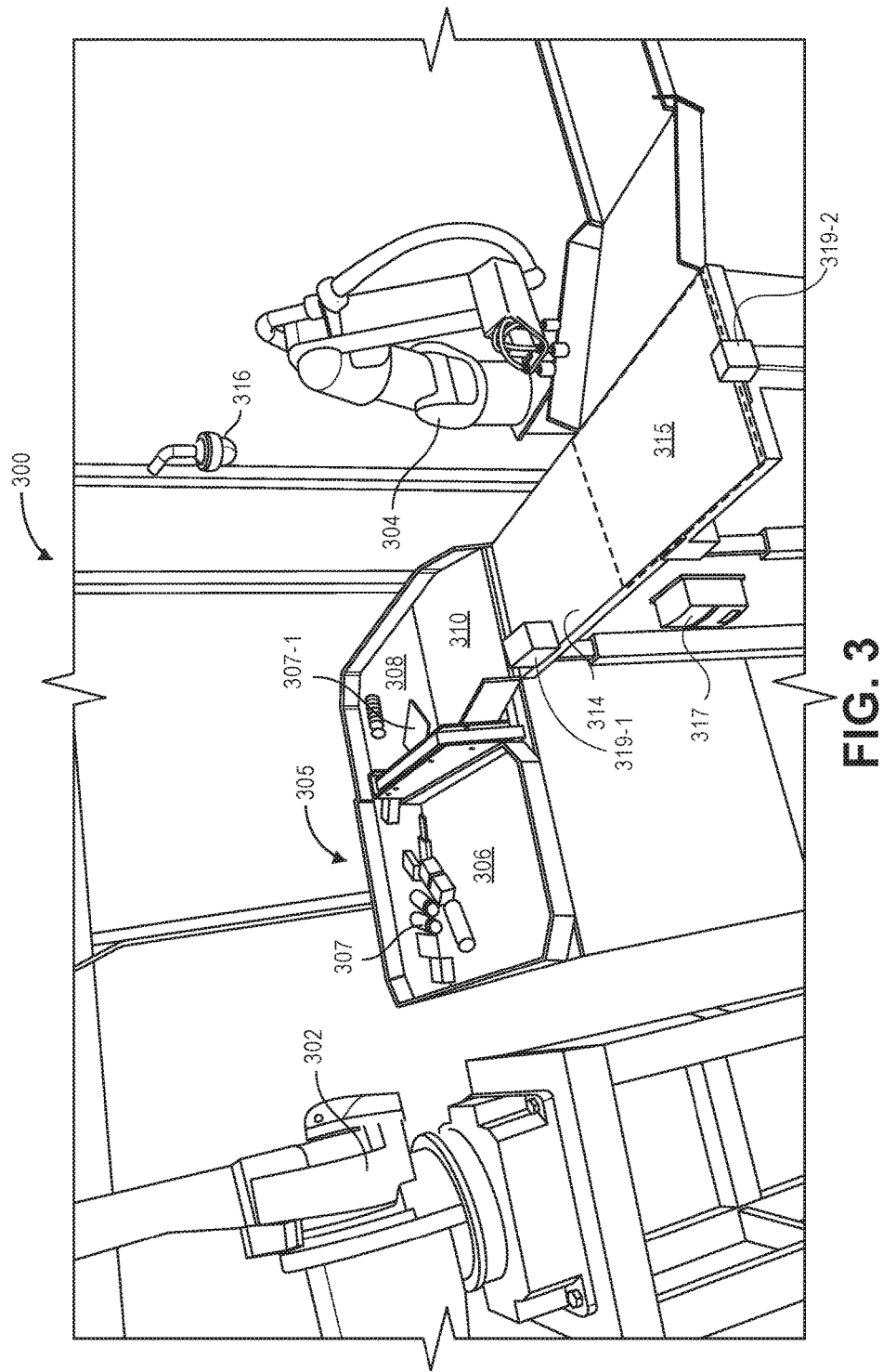
FIG. 3 illustrates another view of a singulation station, according to an implementation.

FIG. 3 illustrates another view of a singulation station 300, according to an implementation. As illustrated, the singulation station 300 includes a first robotic unit 302, a singulation table 305, that includes a receiving area 306, a junction section 308, and a transition section 310. In this example, the first robotic unit 302 has transitioned a plurality of items 307 having different sizes and shapes onto the singulation table 305. In response to movement of the singulation table 305, the items are migrating and separating away from one another. For example, some of the items, such as item 307-1, has de-shingled and migrated ahead of the other items and is about to enter the transition section of the singulation table. This item 307-1 is migrating at a different rate than the other items because it has a larger surface area contacting the singulation table 305 that is causing the item to move in response to the movement of the singulation table 305.

Adjacent the transition section is a pick conveyor 314 configured to convey singulated items from the transition section 310 to the pick area 315. Positioned overhead and above the pick area is an imaging element 316. The imaging element 316 is oriented so that the pick area 315 is within a field of view of the imaging element 316. In some implementations, the pick area 315 includes an illuminated surface or backlight 317 that illuminates toward the imaging element 316. When an item is positioned in the pick area and the backlight 317 is illuminated, the image obtained by the imaging element will have a greater contrast between the light areas, or portions of the pick area that do not include an item, and dark areas, or portions of the pick area that do include an item. The separation between the light and dark areas can be utilized to quickly process the images to determine a shape of the object and select a pick point.

One or more item detection components 319-1, 319-2 may be positioned along the pick conveyor to detect a presence of an item on the pick conveyor. The item detection component may be, for example, a photoelectric sensor (aka photo eye), pressure sensor, imaging element, and/or other component that can be used to detect a presence or absence of an item on the pick conveyor. In some implementations, the overhead camera 316 may be used as the item detection component.

In other implementations, a first item detection component 319-1 may be positioned at or near the junction between the transition section 310 and the pick conveyor to detect a transition of an item from the transition section 310 onto the pick conveyor 314. In such a configuration, the pick conveyor may be activated upon object detection to convey the object from the singulation table to the pick area 315. Likewise, the motion of the transition section 310 may be terminated until the detected item has been transitioned away from the singulation table.

In some implementations, a second item detection component 319-2 may be positioned at or near the pick area to detect a presence of an object in the pick area 315. Upon detection of an object in the pick area, movement of the pick conveyor may be halted so that the imaging element 316 can obtain an image of the object within the pick area for processing and determining of a shape of the object and/or a pick point.

Finally, as discussed above, and as further discussed below, a second robotic unit 304 is positioned adjacent the pick area and configured to pick items from the pick area 315 and transition the items from the singulation station 300.

Figure 4:
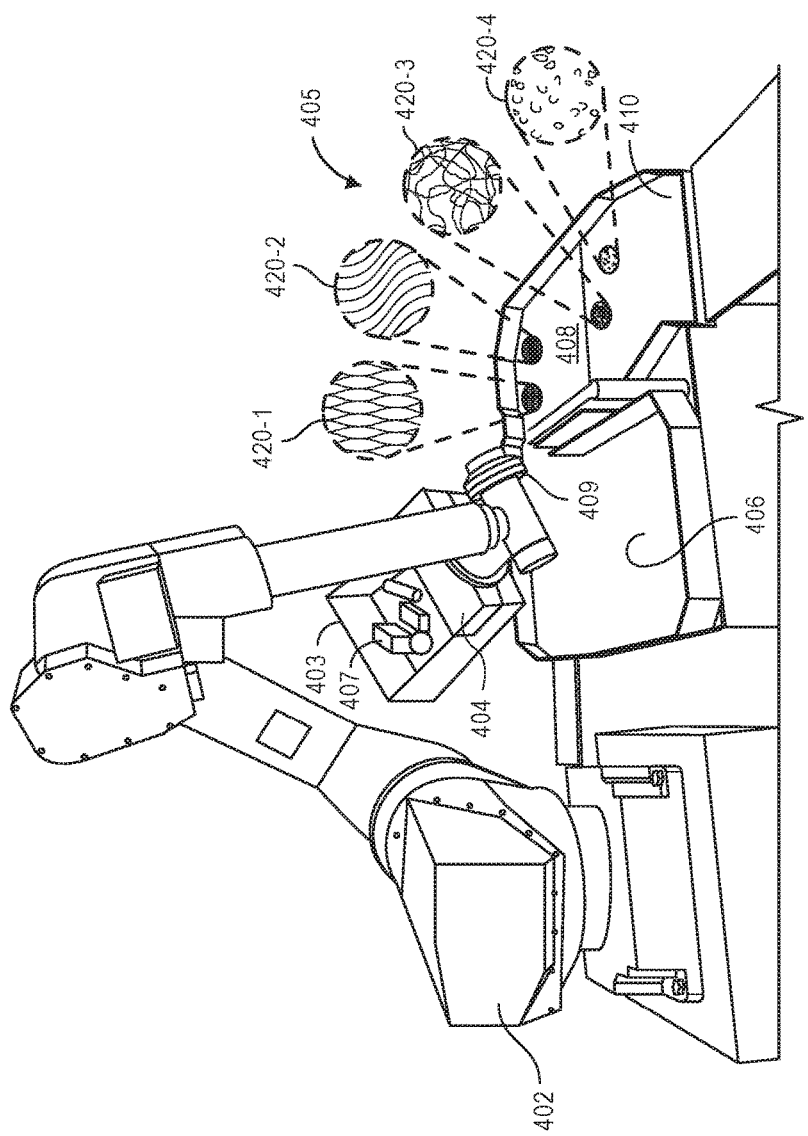
FIG. 4 illustrates a view of the induction robot and the singulation table of a singulation station, according to an implementation.

FIG. 4 illustrates a view of the first robotic unit 402 and the singulation table 405 of a singulation station, according to an implementation. As discussed above, the first robotic unit 402 may engage a tote 403 that contains a plurality of items 407, transition the tote to the singulation station 400 and rotate the tote so that the items 407 are transitioned from the tote 403 to the receiving area 406 of the singulation table 405. For example, the first robotic unit 402 may include a grasping mechanism 404 that grasps totes 403. Likewise, the robotic unit may include a rotation joint 409 that may be used to rotate the tote 403 so that the items transition from the tote onto the receiving area 406 of the singulation table 405. As noted above, in other implementations, the robotic unit 402 may take other forms. For example, the robotic unit 402 may include a single axis mechatronics device that is configured to rotate about a single axis and transition items from a tote onto the receiving area 406. In other implementation, the robotic unit may be a UAV that is configured to engage a plurality of items, or a tote containing a plurality of items, aerially transport the items to the sorting station, and transition the items to the receiving area.

Transition of the items from the tote to the receiving area may be controlled by a rate of rotation of the tote 403 by the robotic unit 402. For example, in some implementations, the robotic unit 402 may receive instructions that cause the first robotic unit 402 to slowly rotate the tote so that different items are transitioned out of the tote and onto the receiving area 406 at different times. Likewise, in some implementations, the position of the tote may be moved with respect to the receiving area 406 as the tote is being rotated so that items are transitioned from the tote 403 onto different portions of the receiving area 406 of the receiving table 405. Likewise, in implementations in which the receiving area 406 includes multiple different portions with different surface types, different items may be transitioned to different portions of the transition section based on the different surface area types of the receiving area 406.

As discussed above, the top surface of one or more sections of the singulation table 405 may have a variety of different textures, formed of different materials, have different shapes, etc. For example, a first portion of the transition section 408 may have a top surface formed of a first material 420-1 and a second portion of the transition section 408 may be formed of a second material 420-2. In a similar manner, the transition section 410 and/or the receiving area 406 may have a top surface formed of multiple different materials, such as materials 420-3, 420-4. As will be appreciated, the shape, angle, pitch, etc. of the different sections of the singulation table 405, as well as the material used to form the top surface of the sections may vary. For example, different materials may be used on different top surfaces of different sections and/or different materials may be used for different portions of different sections of the singulation table 405. For example, the top surface material may be metal, plastic, rubber, fabric, carpet, wood, tile, nylon, etc.

Likewise, the shape, angle and/or orientation of the sections of the singulation table may vary. In addition, as discussed above, one or more of the sections of the singulation table 405 may be active such that the surface of the section of the singulation station moves in response to an actuator operating according to a singulation pattern. Singulation patterns may specify any direction, speed, amplitude, frequency, etc. of movement for the surface area of the table. The movement of the sections of the singulation table may be any form of variable movement, including but not limited to, up, down, side-to-side, ovoidal, circular, angular, or any other pattern and/or combination of patterns.

In some implementations, the singulation pattern may be random, generating different variable movements of the top surface of a section of the singulation table over a period of time. In another example, a singulation pattern may be determined by a singulation controller based at least in part on the items transitioned onto the singulation table. For example, the singulation controller may determine a singulation pattern that results in better migration and singulation for different item types. In one example, heavy items may migrate and singulate better in response to a singulation pattern with a lower frequency movement that has a higher amplitude. In comparison, lighter items migrate and singulate better in response to a singulation pattern with a higher frequency and a lower amplitude.

In some implementations, images of the items as they migrate and singulate along the singulation table may be obtained and processed to determine a singulation response for different items and different singulation patterns. Based on the processed information, singulation patterns may be determined for different items and/or different types of items based on how they respond to different singulation patterns. Item characteristics may be updated based on the singulation patterns that result in better singulation and/or migration of the item.

For a plurality of items of different item types (e.g., having different item characteristics) different singulation patterns may be performed in an alternating manner to optimize singulation of the items. Alternatively, images of the items may be processed and different singulation patterns activated based on the current migration and singulation of the plurality of different items along the singulation table.

Figure 5:
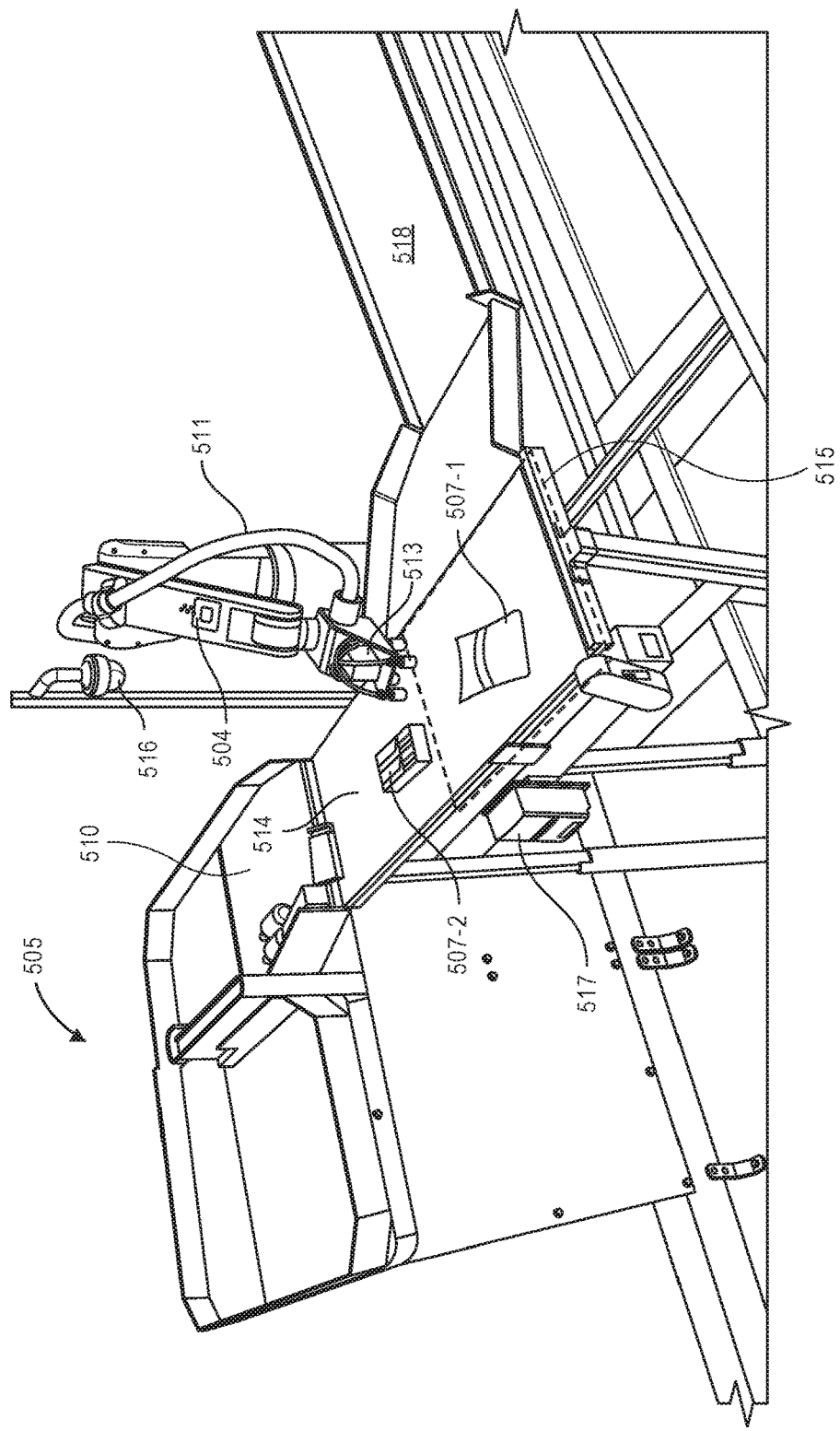
FIG. 5 illustrates a view of the picking robotic unit and the pick conveyor of the singulation station, according to an implementation.

FIG. 5 illustrates a view of the picking robotic unit 504 and the pick conveyor 514 of the singulation station, according to an implementation. As discussed above, the pick conveyor 514 is positioned adjacent the singulation table 505 and receives items 507 as the items transition off a transition section 510 of the singulation table onto the pick conveyor. For example, item 507-1 and item 507-2 have transitioned off the transition section 510 of the singulation table and been conveyed by the pick conveyor 514 toward the pick area 515.

When an item 507-1 is detected as being in the pick area, the pick conveyor halts movement and an image of the pick area 515 is obtained with the overhead imaging element 516. The image is processed by a singulation controller to determine a shape of the item and a pick point on the item (e.g., a center point). The pick point corresponds to a coordinate position within the pick area 515 and that coordinate position is provided by the singulation controller to the picking robotic unit 504.

In some implementations, the pick area is illuminated with a backlight 517 to increase a distinction of the object positioned within the pick area 515. When an image of the item is obtained by the overhead imaging element 516 the distinction between the illuminated area, where no object is present, and the dark area, where the object is present, can be quickly processed by the singulation controller to determine a shape of the object and select a corresponding pick point for the object. For example, the imaging element may be a digital camera that is calibrated with a size and shape of the pick area 515 such that each pixel of an image generated by the digital camera corresponds to a coordinate position of the pick area. The image may be processed using one or more image processing algorithms to determine a perimeter of the object and the pick point may be a coordinate position at a center of the object. In other implementations, a camera pair may be utilized to generate a three-dimensional representation of the object so that the pick point may be selected based on a shape and/or configuration of the object. In still other examples, other forms of imaging or object detection may be used to determine a shape and/or position of the object within the pick area 515 and select a pick point on the object.

The determined pick point is provided to the picking robotic unit 504 and the picking robotic unit 504 moves the astrictive end effector 513 to the received pick point within the pick area 515 and picks the item from the pick area using at least one of suction, adhesion, electroadhesion, or magnetics. For example, the picking robotic until 504 may include a suction line 511 that is affixed to the astriction end effector 513 to generate a negative suction at the astrictive end effector to pick the item from the pick area. In other implementations, rather than using an astrictive end effector, the robotic unit 504 may include a solid extension, plane or arm that is positioned adjacent the singulated item to push or otherwise move the item from the pick area and transition the item from the singulation station. For example, the picking robotic unit 504 may transition the picked item to a conveyor 518 that transitions the item away from the singulation station.

In some implementations, after the picking robotic until 504 has executed the picking of the item, a second image of the picking area 515 may be obtained by the overhead imaging element 516, and processed by the singulation controller to determine that the item is no longer in the pick area. Such a confirmation provides a positive indication that the pick of the item was successful. In comparison, if the item is detected in the second image, it is determined that the pick was not successful and an updated pick point may be determined. For example, if the item moved but remains in the pick area, an updated pick point may be determined based on a new position of the item. Likewise, rather than picking a central point on the item, the pick point may be offset for a subsequent pick attempt.

Subsequent pick attempts may be performed a defined number of times (e.g., three times) before the item is determined to be non-pickable. If an item is determined to be non-pickable, the second robotic unit may be instructed to position the astrictive end effector 513 adjacent the item and swipe or slide the item from the pick area 515 and away from the singulation station.

Information indicating each pick, pick position, pick attempt, successful pick, unsuccessful pick, and determined non-pickable item may be provided to the singulation controller and the singulation controller may utilize that information to develop pick points for the same or similar types of items. For example, if it is determined that an item pick is successful for an item when it has a pick point that is offset approximately twenty millimeters from a center point on the item, when the same or similar type of item arrives in the pick area at a subsequent time, rather than attempting to pick the item from a central pick point, the singulation controller may initially instruct the picking robotic unit to pick the item from a pick point that is offset by approximately twenty millimeters.

Figure 6:
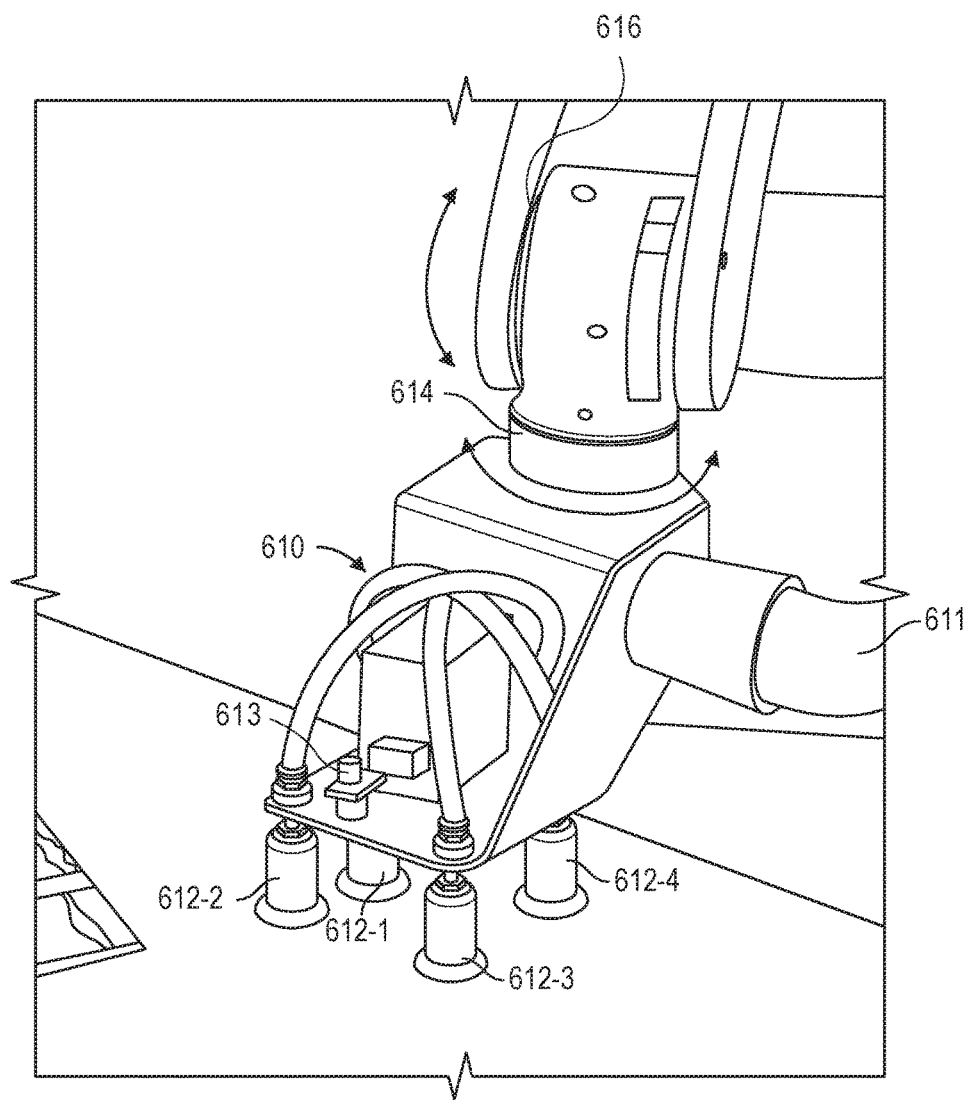
FIG. 6 illustrates a detail view of an astrictive end effector of the picking robot illustrated in FIG. 5, according to an implementation.

FIG. 6 illustrates a detail view of an astrictive end effector 610 of the picking robotic unit illustrated in FIG. 5, according to an implementation. As illustrated, the astrictive end effector 610 includes a plurality of section cups 612-1, 612-2, 612-3, and 612-4 that are coupled to a suction line 611 such that the suction line 611 can generate negative suction through the suction cups to secure the cups to an item. In the illustrated example, the astrictive end effector 610 includes four suction cups 612 arranged in a square pattern. In other implementations, the astrictive end effector 610 may include additional or fewer suction cups and the suction cups may be positioned on the astrictive end effector 610 in any configuration. For example, in some implementations, a suction cup may be positioned on a side of the end effector 610 and oriented at approximately ninety degrees to the illustrated suction cups 612. In such a configuration, the suction cup positioned on the side of the end effector 610 may be used to pick an item from the side and pull, push, or otherwise move the item from the pick area.

The astrictive end effector 610 also includes a distance determining element 613 that is oriented downward with respect to the suction cups 612 and the astrictive end effector 610. The distance determining element 613 may be used to determine a distance between the suction cups 612 and the item to be picked by the astrictive end effector 610. The distance determining element may be any type of element capable of determining a distance between the element and an object. For example, the distance determining element may be a time of flight sensor, an infrared sensor, a light detection and ranging (LIDAR) sensor, a sound navigation and ranging (SONAR) sensor, etc.

The astrictive end effector 610 may be coupled to the picking robotic unit by one or more gimbals or rotation members 614, 616 so that the suction cups 612 can be aligned toward the item and cause a vacuum with the item so that the item can be picked by the astrictive end effector.

Figure 7:
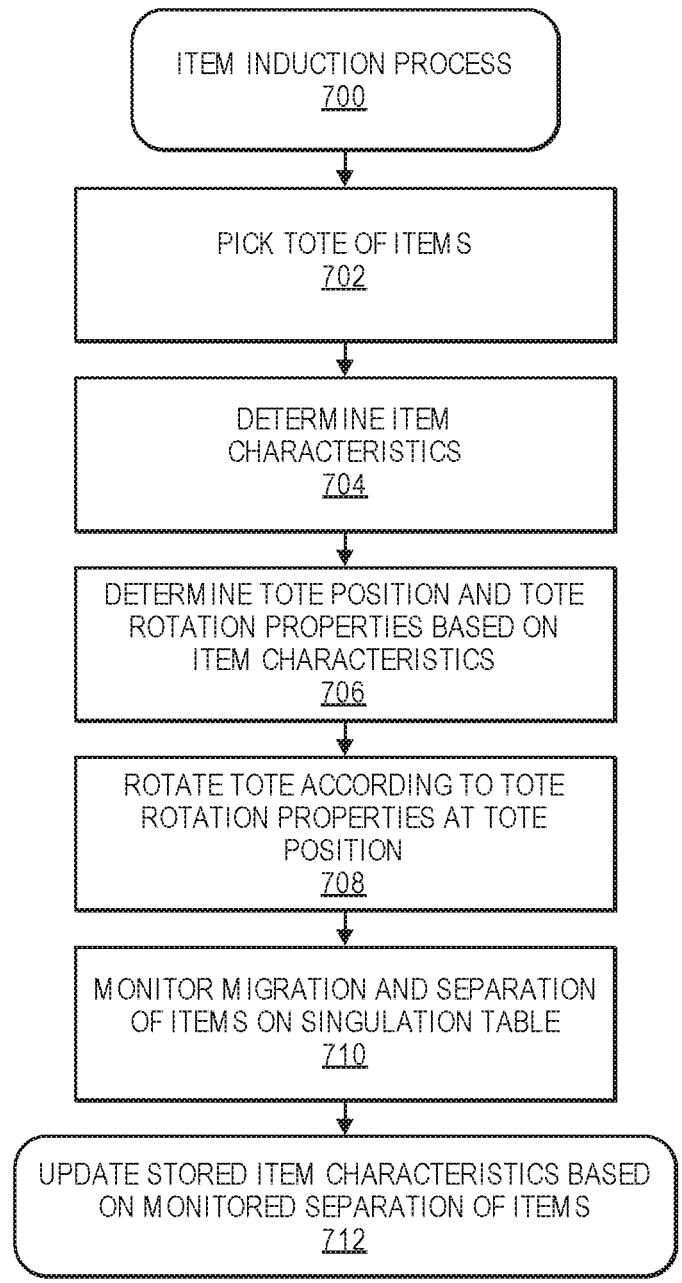
FIG. 7 is a flow diagram illustrating an example item induction process for inducting items into the singulation station, according to an implementation.

FIG. 7 is a flow diagram illustrating an example item induction process 700 for inducting items into the singulation station, according to an implementation. The process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 700 begins with a first robotic unit receiving instructions that cause the first robotic unit to pick a tote of items from a tote receiving area, as in 702. For example, the singulation controller may provide instructions to a first robotic unit to pick a tote from a specific position at the tote receiving area. In other implementations, the first robotic until may be configured to autonomously detect a presence of a tote, position a gripping mechanism with respect to the tote and pick the tote from the tote receiving area.

Based on the picked tote, a plurality of items contained in the tote are determined and item characteristics corresponding to those items are determined, as in 704. For example, as the tote is picked, the tote may be identified and the singulation controller may maintain information indicating the items contained in the picked tote. Based on the items contained in the picked tote, the item characteristics may be determined.

Based on the determined item characteristics, a tote position and tote rotation properties for the tote may be determined that indicate where and how the tote is to be rotated by the first robotic unit so that the items transition to the receiving area of a singulation table of a singulation station, as in 706. As discussed above, a singulation station may include multiple different configurations, shapes, and/or top surface materials. Based on the item characteristics, the items may be transitioned into a specific portion of the receiving area based on the surface area and/or configuration of that portion of the receiving area. In other implementations, the position of the tote may vary as the tote is rotated so that the items are transitioned to the receiving area at different positions.

Based on the determined tote position and tote rotation properties, the tote is rotated over the determined positions of the singulation station so that the items transition from the tote to the receiving area of the singulation table of the singulation station, as in 708. As the items are transitioned to the singulation station, a separation and migration of the items is monitored, as in 710. For example, a series of images may be obtained that include representations of the items as the items de-shingle, separate with respect to other items, and migrate along the singulation table of the singulation station. Those images may be processed and, along with the shape, materials, etc. of the singulation table, as well as the singulation patterns used to move different sections of the singulation table, item characteristics for each of the items that were transitioned from the tote may be updated, as in 712.

Figure 8:
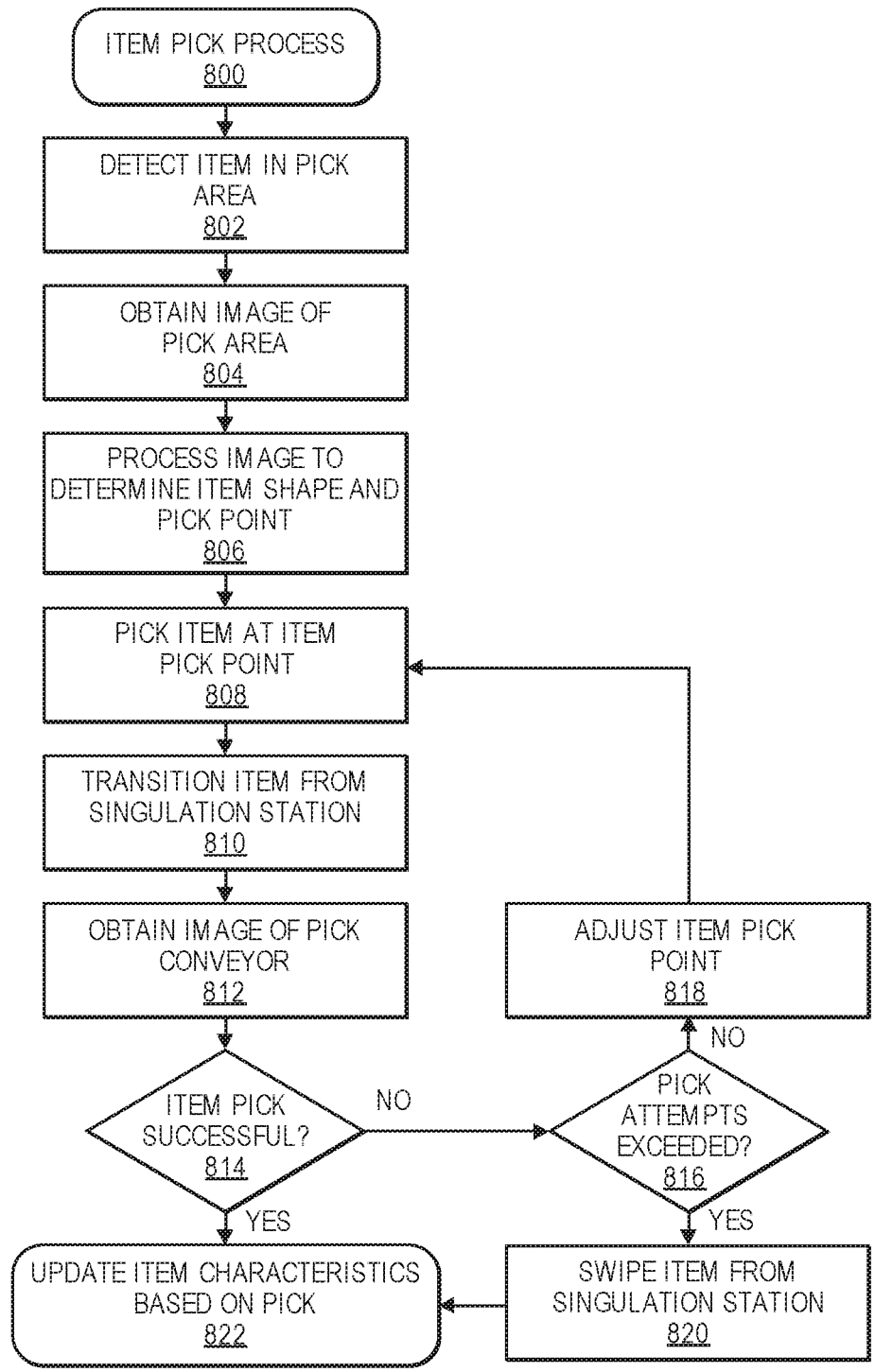
FIG. 8 is a flow diagram illustrating an example item pick process for picking an item at the singulation station, according to an implementation.

FIG. 8 is a flow diagram illustrating an example item pick process 800 for picking an item at the singulation station, according to an implementation. The example process begins by detecting an item in the pick area of the singulation station, as in 802. When an item is transitioned by a pick conveyor into the item pick area, an image of the pick area is obtained, as in 804. As discussed above, one or more imaging elements (e.g., camera) may be positioned such that the pick area is within a field of view of the imaging element.

The obtained image is processed to determine an item shape and an item pick point, as in 806. For example, one or more edge detection algorithms, object detection algorithms, etc., may be utilized to determine a perimeter shape of the item. In some implementations, the image may also be processed to determine an item type and/or to determine the item. For example, a character recognition algorithm, object detection algorithm and/or other processing algorithm may be utilized to detect a type of the object. In some implementations, the item or item type may be determined based simply on the shape of the item. For example, all the different types of the plurality of items currently located at the singulation station may be known based on the items that were transitioned from the tote onto the singulation station. Dimension information may likewise be maintained for those items. Accordingly, an item or item type may be determined based on the shapes of the potential items known to be on the singulation station and the determined shape of the item in the pick area. Such information may be used to update or determine a pick point for the item.

Based on the determined shape and pick point, instructions are sent that cause a second robotic unit with an astrictive end effector to pick the item from the pick area by positioning the astrictive end effector on the item at the determined pick point, as in 808. The picked item is then transitioned by the second robotic unit from the singulation station, as in 810. The item may be transitioned anywhere from the singulation station. For example, if the singulation station is incorporated into a sorting station of a materials handling facility, the picked item may be transitioned to an item identification station at which the item is uniquely identified. In other implementations, the item may be transitioned to another conveyor, into another tote, etc.

After the second robotic unit has picked the item and begun or completed a transition of the item from the singulation station, a second image of the pick area is obtained, as in 812. The second image is processed to determine if the item has been removed from the pick area. As such, a determination is made as to whether the item pick was successful, as in 814. An item pick is determined to be successful if the item is no longer detected in the pick area. In contrast, if the item is determined to still be in the pick area, the item pick is determined to be unsuccessful.

If it is determined that the item pick was not successful, a determination is made as to whether a defined number of pick attempts has been exceeded, as in 816. The defined number may be any number of pick attempts and may vary for different singulation stations, different items, different types of items, etc. If it is determined that the number of pick attempts has not been exceeded, the item pick point is adjusted, as in 818, and the example process 800 returns to block 808 and continues based on the adjusted item pick point. The adjusted item pick point may be randomly selected at an area within the determined shape of the item. Alternatively, different item pick points may be systematically determined based on, for example, which suction cups adhered to the item, a direction the item moved in the receiving area, etc.

If it is determined that the number of pick attempts has been exceeded, instructions are sent that cause the second robotic unit to position the astrictive end effector adjacent the item and swipe or drag the item from the pick area and from the singulation station, as in 820. For example, the instructions may cause the second robotic unit to drag the item from the pick area and onto an outfeed conveyor that will convey the item away from the singulation station.

After swiping the item from the singulation station, or if it is determined at decision block 814 that the item pick was successful, the item characteristics corresponding to the item are updated accordingly, as in 822.

Various operations of a singulation controller, such as those described herein, may be executed on one or more computer systems, interacting with various other devices in a materials handling facility, according to various implementations. For example, the singulation controller discussed above may function and operate on one or more computer systems. One such computer system is illustrated by the block diagram in FIG. 9. In the illustrated implementation, a computer system 900 includes one or more processors 910A, 910B through 910N, coupled to a non-transitory computer-readable storage medium 920 via an input/output (I/O) interface 930. The computer system 900 further includes a network interface 940 coupled to the I/O interface 930, and one or more input/output devices 950. In some implementations, it is contemplated that a described implementation may be implemented using a single instance of the computer system 900 while, in other implementations, multiple such systems or multiple nodes making up the computer system 900 may be configured to host different portions or instances of the described implementations. For example, in one implementation, some data sources or services (e.g., routing, sorting, singulation, singulation pattern selection, etc.) may be implemented via one or more nodes of the computer system 900 that are distinct from those nodes implementing other data sources or services.

In various implementations, the computer system 900 may be a uniprocessor system including one processor 910A, or a multiprocessor system including several processors 910A-910N (e.g., two, four, eight, or another suitable number). The processors 910A-910N may be any suitable processor capable of executing instructions. For example, in various implementations, the processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 910A-910N may commonly, but not necessarily, implement the same ISA.

The non-transitory computer-readable storage medium 920 may be configured to store executable instructions and/or data accessible by the one or more processors 910A-910N. In various implementations, the non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the computer system 900. Generally speaking, a non-transitory, computer-readable storage medium may include storage media or memory media such as magnetic or optical media, e.g., disk or CD/DVD-ROM coupled to the computer system 900 via the I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processors 910A-910N, the non-transitory computer-readable storage medium 920, and any peripheral devices, including the network interface 940 or other peripheral interfaces, such as input/output devices 950. In some implementations, the I/O interface 930 may perform any necessary protocol, timing or other data transformations to convert data signals from one component (e.g., non-transitory computer-readable storage medium 920) into a format suitable for use by another component (e.g., processors 910A-910N). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer-readable storage medium 920, may be incorporated directly into the processors 910A-910N.

The network interface 940 may be configured to allow data to be exchanged between the computer system 900 and other devices attached to a network, such as other computer systems, robots (e.g., first and second robotic units), or between nodes of the computer system 900. In various implementations, the network interface 940 may support communication via wired or wireless general data networks, such as any suitable type of Ethernet network.

Input/output devices 950 may, in some implementations, include one or more displays, projection devices, audio output devices, keyboards, keypads, touchpads, scanning devices, voice or optical recognition devices, or any other devices suitable for entering or retrieving data by one or more computer systems 900. Multiple input/output devices 950 may be present in the computer system 900 or may be distributed on various nodes of the computer system 900. In some implementations, similar input/output devices may be separate from the computer system 900 and may interact with one or more nodes of the computer system 900 through a wired or wireless connection, such as over the network interface 940.

Figure 9:
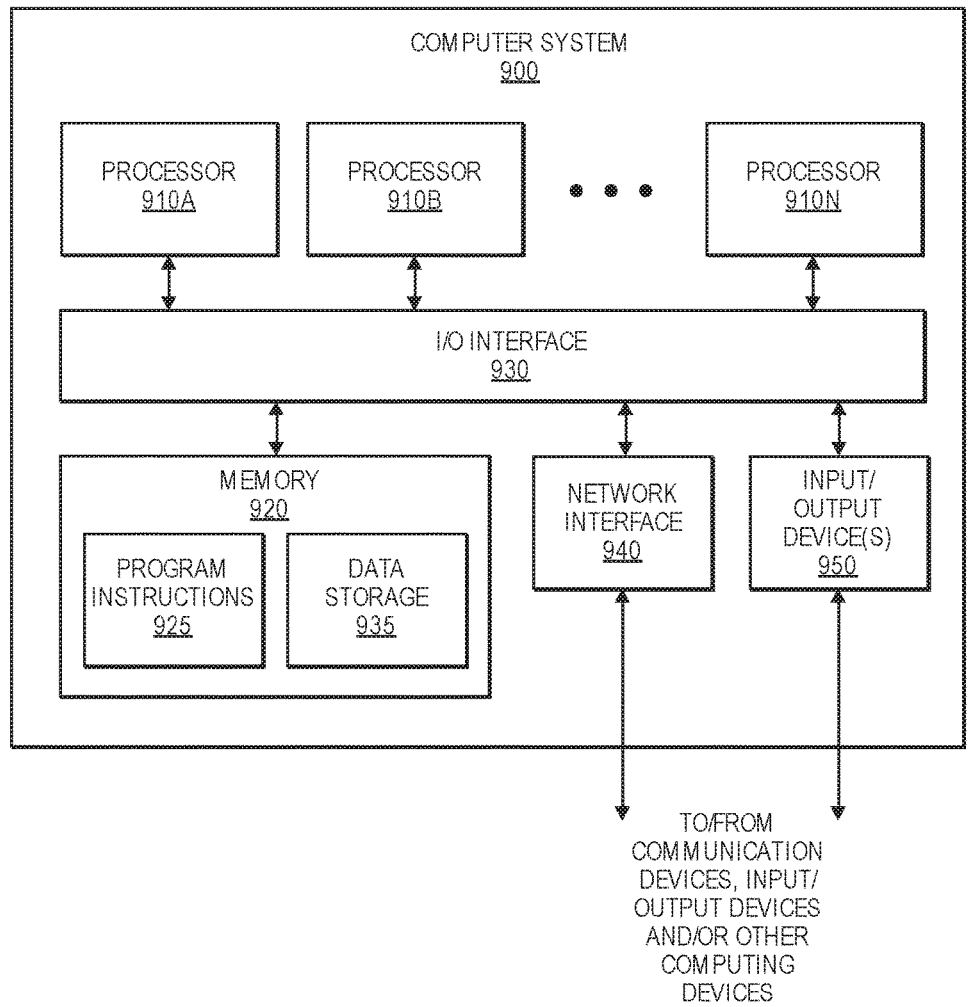
FIG. 9 is a block diagram illustrating an example computer system, according to an implementation.

As shown in FIG. 9, the memory 920 may include program instructions 925 that may be configured to implement one or more of the described implementations and/or provide data storage 935, which may comprise various tables, data stores and/or other data structures accessible by the program instructions 925. The data storage 935 may include various data stores for maintaining one or more item characteristics, singulation patterns, etc.

Those skilled in the art will appreciate that the computing system 900 is merely illustrative and is not intended to limit the scope of implementations. In particular, the computing system and devices may include any combination of hardware or software that can perform the indicated functions, including computers, network devices, internet appliances, robotic devices, etc. The computing system 900 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will appreciate that, in some implementations, the functionality provided by the methods, systems, and apparatus discussed above may be provided in alternative ways, such as being split among more software modules or routines or consolidated into fewer modules or routines, and/or being split into additional or fewer robotic units. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, apparatus, and systems as illustrated in the figures and described herein represent example implementations. The methods and systems may be implemented in software, hardware, or a combination thereof in other implementations. Similarly, the order of any method may be changed and various features may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a non-transitory computer-readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An item singulation method, the method comprising:
 transitioning, using a first robotic unit, a plurality of items from a tote to a singulation table, wherein:
  at least two items of the plurality of items have a different size and a different shape;
  at least two items of the plurality of items are at least partially shingled when transitioned onto the singulation table;
  the singulation table includes a plurality of sections, each of the plurality of sections including a surface that causes the at least two items to at least partially separate with respect to each other and migrate along the surface in response to a variable movement of the section; and
  the singulation table includes at least two sections of the plurality of sections that are oriented in different directions such that the at least two items migrate along each of the at least two sections in a different direction;

activating, using an actuator, the singulation table to at least:
  cause the at least two items to de-shingle;
  cause the plurality of items to at least partially separate in distance with respect to other items of the plurality of items;
  cause the plurality of items to migrate along respective surfaces of the singulation table as a result of a vibration of the singulation table; and
  cause a first item to transition to a pick conveyor;
activating the pick conveyor to transport the first item to a pick area; and
picking, with a second robotic unit, the first item from the pick area.

2. The method of claim 1, wherein at least one surface of the singulation table includes a textured surface that causes the plurality of items to migrate in response to the vibration of the singulation table.

3. The method of claim 1, further comprising:
obtaining an image of the first item at the pick area;
processing the image to determine at least one of a shape of the first item or a pick point with respect to the first item; and
wherein picking includes picking the first item based at least in part on the shape of the first item or the pick point.

4. The method of claim 3, wherein the second robotic unit includes an astrictive end effector configured to pick the first item at the pick point using at least one of a suction, an adhesion, an electroadhesion, or magnetics.

5. The method of claim 4, wherein the singulation table includes at least one of a positive forward pitch, a negative forward pitch or a side pitch that further causes singulation of the plurality of items as the plurality of items migrate along respective surfaces of the singulation table.

6. A singulation station, comprising:
a first robotic unit configured to transition a plurality of different items to a singulation table;
the singulation table including:
  an actuator that causes the singulation table to move when activated;
  a plurality of sections, each of the plurality of sections including a surface that causes an item to at least partially separate with respect to other items of the plurality of different items and migrate along the surface in response to a variable movement of the section; and
  at least two sections of the plurality of sections that are oriented in different directions such that the item migrates along each of the at least two sections in a different direction; and
a second robotic unit configured to pick the item from the plurality of different items and transition the item from the singulation station.

7. The singulation station of claim 6, wherein the first robotic unit is at least one of a six-way positionable robotic arm, a single axis mechatronics unit, or an unmanned aerial vehicle.

8. The singulation station of claim 6, wherein:
a first section of the singulation table includes a first material having a first coefficient of friction; and
a second section of the singulation table includes a second material having a second coefficient of friction.

9. The singulation station of claim 6, further comprising:
a pick conveyor positioned adjacent the singulation table to receive items of the plurality of different items as the items migrate off the singulation table, the pick conveyor configured to convey the items to a pick area; and
wherein the second robotic unit picks items from the pick area.

10. The singulation station of claim 9, further comprising:
an overhead camera positioned above the pick area to obtain an image of an item positioned in the pick area; and
wherein the second robotic unit receives a pick position corresponding to a pick point on the item based at least in part on item position information determined from a processing of the image of the item positioned in the pick area.

11. The singulation station of claim 6, further comprising:
a distance determining element configured to determine a distance between the item and an end effector of the second robotic unit used to pick the item.

12. The singulation station of claim 11, wherein:
the distance determining element is coupled to the end effector of the second robotic unit; and
the end effector is configured to pick the item.

13. The singulation station of claim 6, the second robotic unit further including:
an astrictive end effector configured to pick the item using at least one of a suction, an adhesion, an electroadhesion, or magnetics.

14. The singulation station of claim 13, the second robotic unit further comprising:
a plurality of suction cups positioned on the astrictive end effector and configured to cause a suction when contacted against the item to enable a picking of the item.

15. A system, comprising:
a first robotic unit configured to transition a plurality of items of different types to a singulation table;
the singulation table configured to move according to a singulation pattern using an actuator, the singulation table including a plurality of sections, each of the plurality of sections including a surface that causes an item to at least partially separate with respect to other items of the plurality of items and migrate along the surface in response to a movement of the section, and at least two sections of the plurality of sections being oriented in different directions such that the item migrates along each of the at least two sections in a different direction;
a pick conveyor positioned adjacent the singulation table and configured to receive items of the plurality of items and transition the items to a pick area; and
a second robotic unit configured to pick an item from the pick area and transition the item from the pick conveyor.

16. The system of claim 15, further comprising:
a singulation controller in communication with the singulation table, the singulation controller configured to at least:
  determine a type of each item of the plurality of items;
  determine, based at least in part on the type of each item of the plurality of items, the singulation pattern; and
  send instructions to the actuator of the singulation table that cause the singulation table to move according to the singulation pattern.

17. The system of claim 15, wherein the singulation pattern indicates at least one of an amplitude of a movement, a frequency of the movement, a direction of the movement, or a variation of the singulation pattern.

18. The system of claim 15, the second robotic unit further comprising:

an astrictive end effector configured to pick an item using suction; and a distance determining element positioned on the astrictive end effector, the distance determining element configured to determine a distance between the item and the astrictive end effector.

19. The system of claim 15, further comprising:

an imaging element configured to obtain images of the pick area, wherein the images are processed to determine at least one of a position of an item in the pick area, or a confirmation of a pick of the item from the pick area.

* * * * *